US008433670B2

(12) United States Patent
Chidlovskii

(10) Patent No.: US 8,433,670 B2
(45) Date of Patent: Apr. 30, 2013

(54) SYSTEM AND METHOD FOR RECOMMENDING ITEMS IN MULTI-RELATIONAL ENVIRONMENTS

(75) Inventor: Boris Chidlovskii, Meylan (FR)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/040,005

(22) Filed: Mar. 3, 2011

(65) Prior Publication Data
US 2012/0226651 A1 Sep. 6, 2012

(51) Int. Cl.
*G06N 5/02* (2006.01)

(52) U.S. Cl.
USPC ............................................. 706/52; 706/46

(58) Field of Classification Search ........................ None
See application file for complete search history.

(56) References Cited

U.S. PATENT DOCUMENTS

| 7,904,187 B2* | 3/2011 | Hoffberg et al. ................. 700/83 |
| 2006/0122998 A1* | 6/2006 | Bar-Yossef et al. ................ 707/5 |
| 2006/0190225 A1* | 8/2006 | Brand ............................... 703/2 |
| 2006/0262115 A1* | 11/2006 | Shapiro .......................... 345/419 |
| 2011/0270774 A1* | 11/2011 | Varshavsky et al. ........... 705/319 |

OTHER PUBLICATIONS

Agarwal, "Learning Random Walks to Rank Nodes in Graphs", International Conference on Machine Learning, 2007, pp. 9-16.*
Allan Borodin, Gareth O. Roberts, Jeffrey S. Rosenthal, and Panayiotis Tsaparas, "Link Analysis Ranking: Algorithms, Theory, and Experiments", ACM Transactions on Internet Technology, vol. 5, No. 1, Feb. 2005, pp. 231-297.
Don Coppersmith, Peter Doyle, Prabhakar Raghavan, and Marc Snir, "Random Walks on Weighted Graphs, and Applications to On-Line Algorithms", J.ACM, 40(3):421-453, 1993.
Nikhil Garg and Ingmar Weber, "Personalized, Interactive Tag Recommendation for Flickr", In RecSys '08: Proceedings of the 2008 ACM conference on Recommender systems, pp. 67-74, New York, NY USA, 2008, ACM, 10 pages.
Kristina Toutanova, Christopher D. Manning, and Andrew Y. Ng. "Learning Random Walk Models for Inducing Word Dependency Distributions"., In ICML'04:Proc. of the International Conference on Machine Learning, 2004, 8 pages.
Dong Liu, Xian-Sheng Hua, Linjun Yang, Meng Wang, and Hong-Jiang Zhang, "Tag Ranking", In WWW '09: Proceedings of the 18th International conference on World Wide Web, pp. 351-360, New York, NY, USA, 2009. ACM.
Simon Overell, Borkur Sigurbjornsson, and Roelof Van Zwol, "Classifying Tags using Open Content Resources", In WSDM '09: Proceedings of the Second ACM International Conference on Web Search and Data Mining, pp. 64-73, New York, NY, USA, 2009. ACM. Larry Page, Sergey Brin, R. Motwani, and T. Winograd, "The pagerank citation ranking: Bringing order to the web", 1998, 18 pages.
Borkur Sigurbjornsson, and Roelof Van Zwol, "Flickr Tag Recommendation based on Collective Knowledge", In WWW '08: Proceedings of the 17th International Conference on World Wide Web, pp. 327-336, New York, NY, USA, 2008. ACM.

* cited by examiner

*Primary Examiner* — Kakali Chaki
*Assistant Examiner* — Walter Hanchak
(74) *Attorney, Agent, or Firm* — Fay Sharpe LLP

(57) ABSTRACT

A system, method, and computer program product for making a recommendation to a user of a social network to associate an existing tag with a social media entity instance are provided. The method includes generating a random walk model that includes the social media entity instance for at least a portion of the social network, determining weighted values for the random walk model, generating a weighted random walk model based on the random walk model and the weighted values, performing a random walk on the weighted random walk model starting at the social media entity instance, and recommending an existing tag to the user based on the random walk.

21 Claims, 9 Drawing Sheets

SYSTEM AND METHOD FOR RECOMMENDING ITEMS IN MULTI-RELATIONAL ENVIRONMENTS

BACKGROUND

The exemplary embodiment relates to a system and method for recommending items in multi-relational environments such as social networks. Social networks are represented logically as relational graphs where entities belonging to the social networks are linked by one or more relations.

Large social media networks such as media sharing sites Flickr and YouTube contain many (e.g., billions) of images and videos uploaded and annotated by many (e.g., millions) of users. The ability to tag media objects (such as images and videos) within social networks is a powerful mechanism for improving media sharing and search facilities. In such social networks, tags play the role of metadata for the associated media objects. However, these tags are often provided in a free form reflecting an individual user's unique perception of a media object rather than a uniform and consistent methodology for identifying and tagging on object. The lack of uniformity in tagging can reduce the effectiveness of searching based on tags, since the searcher and the tagger may employ different terminology. Despite this free individual choice, some common usage topics emerge when people agree on the semantic description of a given media object or a group of objects.

In the case of media sharing sites such as Flickr and YouTube, the wealth of annotated and tagged objects on the sites form a base for suggesting tags for new and existing media objects. Recommendation systems are particularly useful in bootstrap and querying modes. In the bootstrap mode, a recommendation system suggests the most relevant tags for newly uploaded objects. In the query mode, a user annotating an image is presented with recommended tags that can augment the existing image tags. Both modes can ease the annotation task for the user and help expand the coverage of the tags annotating the images.

In a broader sense, the activity on social network sites often spans along multiple dimensions involving a variety of entity types (e.g. "entities") and relationships (relations) between them. Thus, tag recommendation is just one of many possible scenarios of recommending data to a user of a social networking site based on meta-data of other social network objects. For example, other recommendation scenarios may concern recommending contacts or a group for a user, recommending an image for a group, etc. These recommendations may be provided based on multiple relationships between entities in a social network. Accordingly, it is desirable to know, for a given recommendation task, which relations between entities are relevant to the recommendation task and how the relations are used to recommend items in an optimal manner.

BRIEF DESCRIPTION

In accordance with one aspect of the exemplary embodiment, a method for making a recommendation to a user of a social network to associate an existing tag with a social media entity instance is provided. The method includes generating a random walk model that includes the social media entity instance for at least a portion of the social network, determining weighted values for the random walk model, generating a weighted random walk model based on the random walk model and the weighted values, performing a random walk on the weighted random walk model starting at the social media entity instance, and recommending an existing tag to the user based on the random walk.

In another aspect, a system for performing a recommendation task is provided. The system includes memory for storing a relational graph representing a social media data model of a social media network and instantiated social media data. The system also includes a relational graph unfolding module adapted to determine an unfolded relational graph by unfolding the instantiated social media data into co-occurrence matrices based at least in part on the relational graph, a general random walk generator adapted to generate a random walk model based at least in part on the recommendation task and the unfolded relational graph, a weighted random walk generator adapted to generate a weighted random walk model based on the random walk model and weighted values, and a social media selection module adapted to perform a random walk on the weighted random walk model, and output a recommendation based at least in part on the random walk.

In yet another aspect, an apparatus for performing a recommendation task is provided that includes a processor configured to generate a random walk model for a social media data model based at least in part on the recommendation task by determining a Markov chain over a set of states S specified by an initial distribution $P_0$ over S, and a set of state transition probabilities $P(S_t|S_{t-1})$, learn weighted values for the random walk model, generate a weighted random walk model based on the random walk model and the learned weighted values, and perform a random walk on the weighted random walk model to generate one or more recommendations. The Markov chain state transition probabilities are reset with a probability $\alpha > 0$ according to the initial state distribution $P_0$, and the stationary distribution $\pi$ is defined as $$\pi = \alpha \sum_{t=0}^{\infty} (1-\alpha)^t P_0 P^t.$$

DETAILED DESCRIPTION

Figure 1:
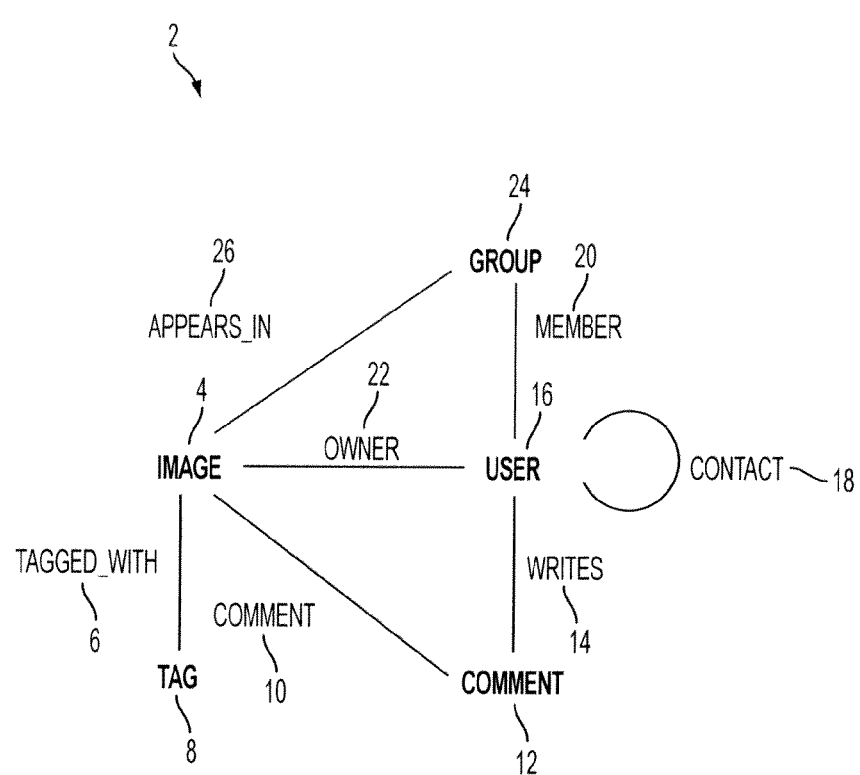
FIG. 1 is a schematic view of a relational graph representing a social media data model.

Disclosed herein are a system and method for recommending items in multi-relational environments such as social networks. To this end, the exemplary embodiments relate to a multi-relational framework capable of integrating a number of different entities and relations between them, using the relations to build data models for different recommendation tasks, and finding the optimal contribution of each relation to a given recommendation task. Social networks, as used herein, refer to an interconnected electronic network structure composed of nodes (entities) having relationships (relations) between nodes based on the properties of the nodes. For example, a social network may represent relationships between electronic representations of people, groups, organizations, animals, computers, media objects (such as audio-visual works or images), metadata elements (such as comments or tags) and so forth.

In a multi-relational setting such as a social network, entities of same or different types are connected to form multiple relations. Each relation in the network may be represented by a uni-type edge (for same type entities, like user-to-user) or a bi-partitive edge (for entities of different types, like user-to-image). In the exemplary system and method, the entities and relations that form a social network are not limited to one specific social network and may integrate entities from multiple social networks. In one embodiment, personal profiles and data from separate social networks are connected via common entities (such as common personal credentials). For example, some social networking sites (such as Facebook®, MySpace®, Google Friend Connect®) provide an application programming interface (API) that allows for determining common users across platforms via social-network connectors. In some embodiments, publicly accessible data (such as page recommendations in the Delicious social network, and relevant tweets on Twitter) are used to construct a unified social network. For purposes of explanation, the social media site Flickr is used as an example of a social media sharing system. Flickr is a social media site that allows users to tag and comment on images uploaded by the same or other users. The users themselves may be logically connected to other uses or be members of groups.

As used herein, a recommendation task concerns the recommendation of one or more instances of one entity in the social network for an instance of a second entity in the network. The first and second entities may be of the same type or of differing types. For example, a recommendation task may involve recommending a tag for an image, recommending a contact or group for a user, or recommending a user for a user. Additionally, as used herein, an "entity" is a description of single object about which data can be stored, and an instance of an entity is a single occurrence of the entity. For example, a social network may have a "user" entity, wherein an instance of the user entity is "Bob Jones." To this end, "instantiated" social media data refers to a collection of one or more social media data instances.

At a high level, for a given recommendation task, the exemplary embodiment obtains a relational graph representing a social network model. The social network model may be a model of a single social network, or it may be an integration of multiple social network models. The relational graph representing the social network model is transformed into a Markov Chain where the strength of each relation between two entities in the social network model depends on a random walk between the two entities. To perform this transformation, the relational graph, in conjunction with an instantiation of social network data relating to the relational graph, is unfolded into co-occurrence matrices (one for each relation between entities) which are then combined with a weighted average optimized on a pre-annotated training set. A random walk is then performed on the weighted unfolded matrices to obtain a set of recommendations.

With reference to FIG. 1, an illustrative relational graph 2 representing a social media data model (such the Flickr network) is shown. The relational graph 2 includes entities 4, 8, 12, 16, 24 connected by relations 6, 10, 14, 18, 20, 22, 26. Each relation defines how two entities can be related. For example, user owns image, and so the user entity 16 is linked with the image entity 4 by the relation "owner" 22. Similarly, an image may be tagged with a tag, and so the image entity 4 is linked with the tag entity 8 by the "tagged_with" relation 6. As yet another example, two users can be linked, for example as contacts, and this is indicated in the relational graph 2 of FIG. 1 by including the "contact" uni-type edge relation 18.

At a logical level, the relational graph 2 allows for the integration of all entities and relations of the social network in one uniform way. In mathematical terms, the relational graph 2 may be written as G=(E,R), where entity types $e_k \in E$ are represented as nodes and relations $r_{kl} \in R$ between entity types $e_k$ and $e_l$ are represented as (typed) links. Note that for a uni-type relation such as the "contact" relation 18, k=l. When instantiated, however, $e_k$ and $e_l$ will be instantiated as instances of two different user entity instances. In FIG. 1, the illustrative relational graph 2 has no more than one relation between any two entity types $e_k$ and $e_l$. However, relational graphs may have more than one relation between any two entities $e_k$ and $e_l$. Moreover, some entities may have no allowable relation—for example, there is no relation between the tag entity type 8 and the comment entity type 12 in the relational graph 2 of FIG. 1.

Each relation in the relational graph is internally homogeneous in a sense that the same values in a relation tend to have to same importance for a recommendation task. For any given recommendation task, different relations may differ in importance relative to a given recommendation task. For example, the tagged_with relation 6 between image entity 4 and tag entity 8 is expected to be more important to a tag recommendation task than the member relation 20 between the user entity 16 and group entity 24.

Figure 2:
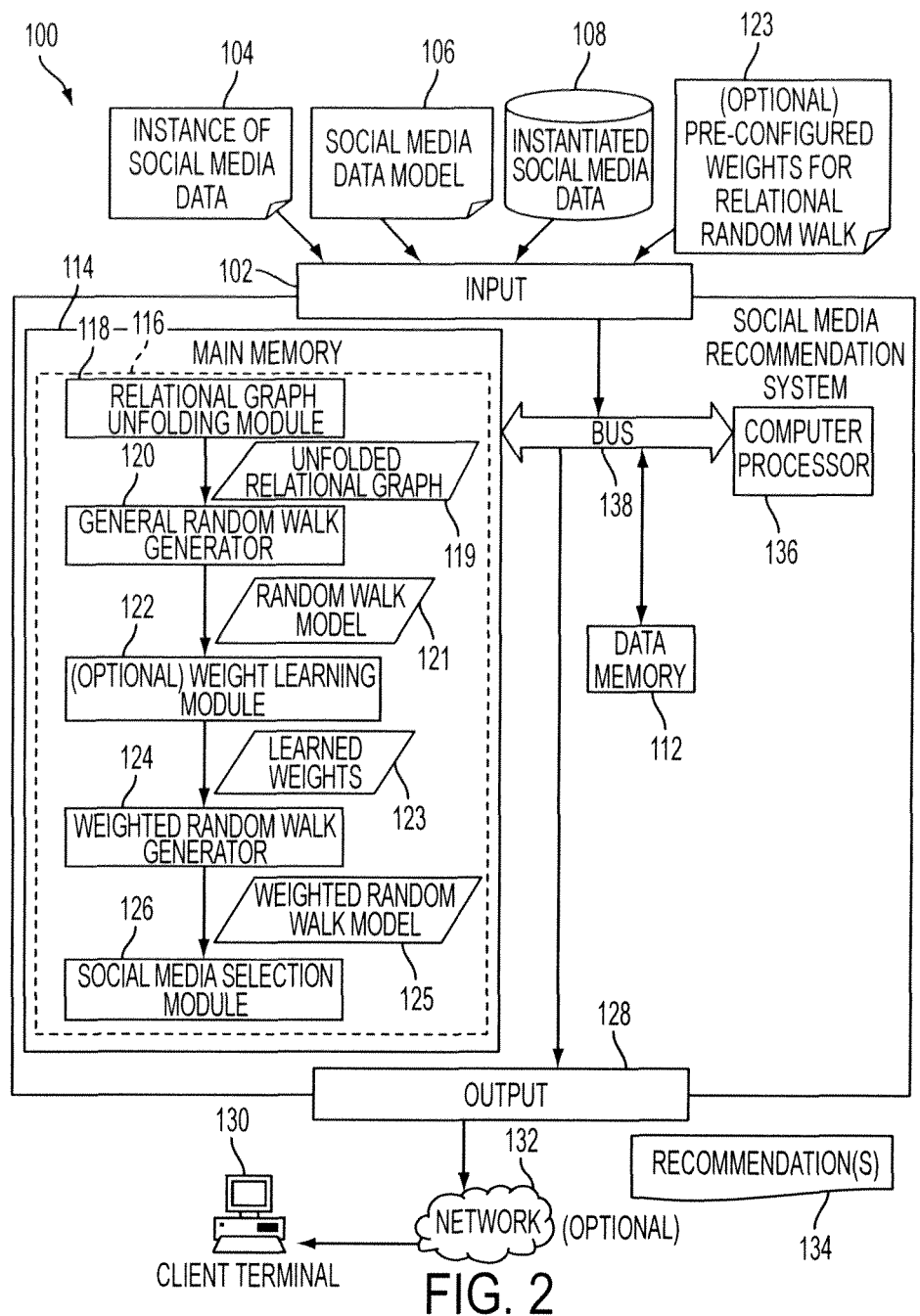
FIG. 2 illustrates a system for recommending items in multi-relational environments.

FIG. 2 illustrates an exemplary system 100 for recommending entity instances to be related with a given entity instance in multi-relational environments such as social networks. The system 100 is a non-transitory device which includes an input device 102 for receiving data representing an entity instance 104 (such as a specific image), a social network model 106, instantiated social media data 108 (such as specific user data for a social network), and optionally, pre-configured weights 123 for a random walk model. In the alternative, inputs 104, 106, 108, 123 may be produced by and/or stored in the system 100 itself. Prior to inputting, inputs 104, 106, 108, 123 may be stored in any suitable tangible storage media such as a disk, ROM or RAM, or may be input into the system 100 in the form of a carrier wave, e.g., via the Internet. The input device 102 may include a modem link, a wired or wireless connection, USB port, floppy or hard disk receiver, transceiver portion of a cellular telephone, or the like and may be separated or combined with other components of the system 100.

The system 100 includes data memory 112 for storing the single instance of social media data 104, social media data model 106, instantiated social media data 108 and optional pre-configured weights 123 during processing. Main memory 114 of the system 100 stores instructions 116 for performing the exemplary method, including a relational graph unfolding module 118, a general random walk generator 120, an optional weight learning module 122, a weighted random walk generator, and a social media selection module 126. It is to be appreciated that the two memories 112, 114 may be embodied as a single memory unit, or that one or both of the memories 112, 114 may comprise two or more component memory units. The instructions 116 are suitably executed on a digital processor such as an illustrated computer processor 136. The computer processor can be variously embodied, such as by a single core processor, a dual core processor (or more generally by a multiple core processor), a digital processor and cooperating math coprocessor, a digital controller, or the like. Outputs from modules 118, 120, 122, 124, 126 may be stored in memories 112, 114 and/or output via an output device 128 to a client terminal 130, optionally through a network 132 such as the Internet. In one illustrative example, the user accesses the social network using a mobile device, but the system 100 is a service provided by the social network. In this case, the system 100 is located at a server supporting the social network (which server may be a distributed or "cloud" computing network), the input 102 and output 128 are suitably an Internet portal of the server, the processor 136 and memory 112, 114 are suitably embodied by the digital processor (e.g., microprocessor or parallel array of microprocessors) and memory component(s) of the server, the network 132 is suitably the Internet together with any downstream networks (e.g., the cellular telephone network or WiFi network), and the client terminal 130 is suitably the mobile device including its display screen for displaying output.

The relational graph unfolding module 118 receives as input a social media data model 106 and instantiated social media data 108 via the input device 102. As described above, the social media data model 106 is, or may be converted to, a relational graph such as the relational graph 2 illustrated by FIG. 1. The module 118 unfolds the instantiated social media data 108 into co-occurrence matrices (i.e., the unfolded relational graph 119) reflecting the entity relationships defined by the social media relational graph. This unfolding process is described in more detail with respect to step S140 of FIG. 4.

The general random walk generator 120 receives as input the unfolded relational graph 119 generated by the relational graph unfolding module 118 and constructs a random walk model 121. The random walk model 121 is generated by constructing a Markov chain from the unfolded relational graph 119. As will be appreciated by one of ordinary skill, a Markov chain (or Markov model) is a model having states wherein the next state for any given state depends only on the given state. In the exemplary embodiment, the Markov chain itself is designated as the random walk model 121. The process of generating the random walk model 121 from the unfolded relational graph 119 is described in more detail with respect to step S150 of FIG. 4.

The optional weight learning module 122 determines a set of weighted values 123 that represent the weighted contributions of each relation in the relational graph (e.g., FIG. 1, relational graph 2) for a given recommendation task. For example, with respect to the relational graph 2 of FIG. 1, if a recommendation of a tag 8 is to be made with respect to a given image 4, the owner relation 22 may be weighted more heavily than the appears_in relation 26 if it is determined that the owner relation 22 is a better indicator of which tag 8 to recommend for a given image 4. This process of determining a set of weighted values 123 is described in more detail below with respect to step S160 of FIG. 4.

The weighted random walk generator 124 receives as input the set of weighted values 123 from the weight learning module 122 and the random walk model 121 from the general random walk generator 120. In an alternate embodiment, weighted values 123 are provided from a source other than the weight learning module 122, such as values directly input by an operator of the system 100. The weighted random walk generator 124 then applies the set of weighted values 123 to the random walk model 121 to create a weighted random walk model 125. In the exemplary embodiment, the weighted random walk model 125 is the random walk model 121 with a stationary distribution $\pi$ adjusted according to the set of weighted values 123. The generator 124 then provides the weighted random walk model 125 to the social media selection module 126. The process of generating the weighted random walk model 125 is described in more detail below with respect to step S170 of FIG. 4.

Figure 3:
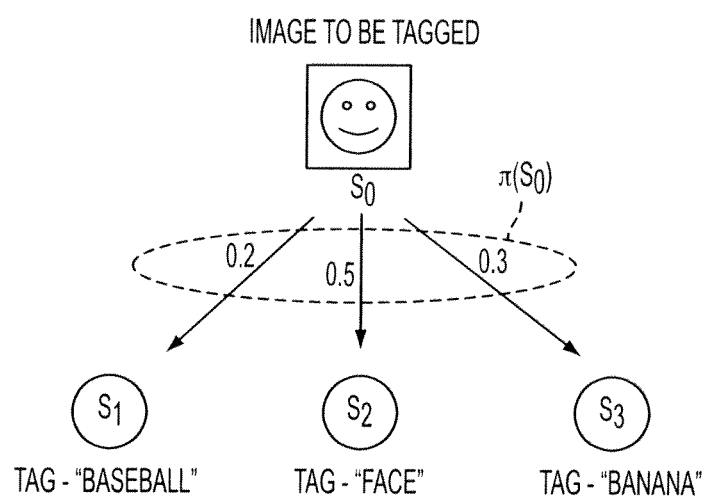
FIG. 3 illustrates a simplified weighted random walk model with respect to an image to be tagged.

The social media selection module 126 receives as input the weighted random walk model 125 from the weighted random walk generator 124 and performs a random walk on the weighted random walk model 125 to select one or more entity instances for the given recommendation task with respect to the input instance of social media data 104. The selected entity instances are then output as recommendations 134 for the given input entity 104. For example, a simplified weighted random walk model 125 is provided in FIG. 3 with respect to an image to be tagged (noted by state $S_0$). In this example, a random walk performed on the model 125 will likely result in the tag represented by state $S_2$ to be selected since the random walk provides a 50% chance that $S_2$ will be the next state as opposed to the 20% chance for $S_1$ and 30% chance for $S_3$. The random walk may be performed multiple times to select multiple entity instances. This process of selecting entity instances from the weighted random walk model 125 is described in more detail below with respect to step S180 of FIG. 4.

In the exemplary embodiment, components 114, 116, 118, 120, 122, 124, 126 comprise software instructions stored in main memory 112, which are executed by a computer processor 136. The processor 136, such as the computer's CPU, may control the overall operation of the computer system 100 by execution of processing instructions stored in memory 112. Components 102, 112, 114, 116, 118, 120, 122, 124, 126, 128, 136 may be connected by a data control bus 138.

As will be appreciated, system 100 may include fewer or more components while still having the same functionality. For example, components 116, 118, 120, 122, 124, 126 may be combined to form fewer components, or may be functionally separated to form more individual components.

The system 100 may comprise one or more computing devices, such as a personal computer, PDA, laptop computer, server computer, or combination thereof. Memories 112, 114 may be integral or separate and may represent any type of computer readable medium such as random access memory (RAM), read only memory (ROM), magnetic disk or tape, optical disk, flash memory, or holographic memory. In one embodiment, the memories 112, 114 comprise a combination of random access memory and read only memory. In some embodiments, the processor 136 and memory 112 and/or 114 may be combined in a single chip.

The system 100 may output the recommendations 134 to an output device, such as a client terminal 130, a server, or the like. The output device 128 may be connected directly with the system 100 or linked thereto, e.g., via a wired to wireless link 132, such as a local area network, wide area network, or the Internet. The system 100 or client terminal 130 may generate a graphical user interface (GUI) for display to a user. The exemplary GUI (not shown) enables a user to interact with the system 100 via the display screen of the client terminal 130 with a user input device, such as a cursor control device, keyboard, keypad, joystick, or the like. In the exemplary embodiment, the client terminal 130 may include a web browser which allows the user to interact with the system 100, which may be implemented by a server computer.

The term "software" as used herein is intended to encompass any collection or set of instructions executable by a computer or other digital system so as to configure the computer or other digital system to perform the task that is the intent of the software. The term "software" as used herein is intended to encompass such instructions stored in a storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 4:
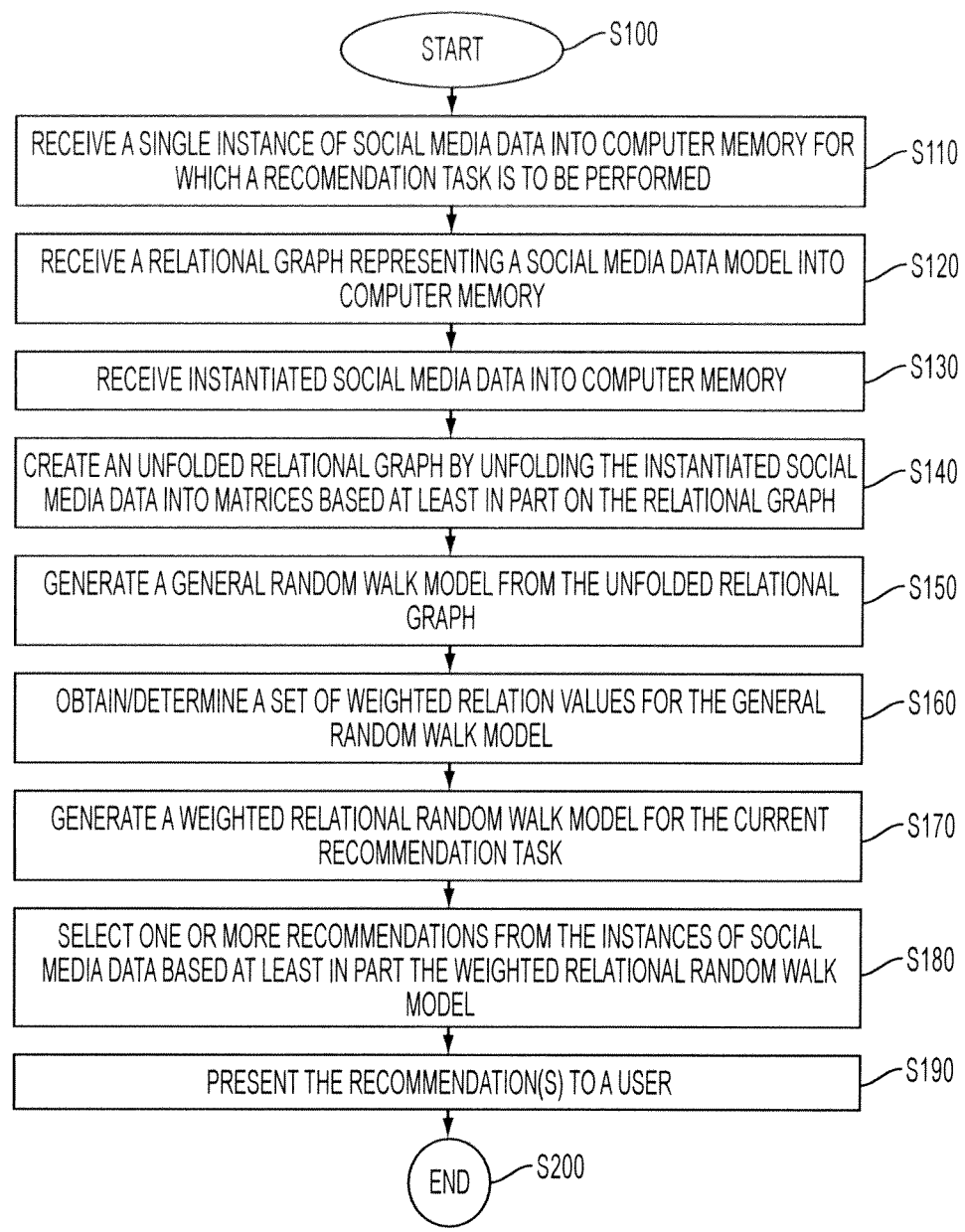
FIG. 4 is a flow chart illustrating a method for recommending items in multi-relational environments that may be performed on the system of FIG. 2.

FIG. 4 illustrates an exemplary method for recommending items in multi-relational environments. The method may be performed on the exemplary system detailed in FIG. 2. The method begins at S100.

At S110, the social media recommendation system 100 receives into memory 112 and/or 114 a single instance of social media data 104 (such as an image) upon which a recommendation task is to be performed. For explanatory purposes, it is assumed that the recommendation task is to recommend one or more tags for an input image. However, the recommendation task generally covers the recommendation of one or more instances of one entity in the social network for an instance of a second entity in the network.

At S120, the social media recommendation system 100 receives into memory 112 and/or 114 a relational graph 106 representing a social media data model. For example, relational graph 2 of FIG. 1 is a representation of the Flickr social media data model and may be input into the system 100.

At S130, the social media recommendation system 100 receives into memory 112 and/or 114 instantiated social media data 108. The instantiated social media data contains one or more social media entity instances (such as images, tags, users, etc) that conform to the input social media data model 106.

At S140, the relational graph unfolding module 120 generates an unfolded relational graph 119 by creating co-occurrence matrices based on the social media data model 106 and the instantiated social media data 108. As stated above, the social media data model 106 is a graph given by G=(E,R), where entity types $e_k \in E$ are represented as nodes and relations $r_{kl} \in R$ between entities of types $e_k$ and $e_l$ are represented as (typed) links. To create the unfolded relational graph 119, each relation $r_{kl}$ is unfolded (instantiated) in the form of a matrix $A_{kl} = \{a_{kl}^{ij}\}$, i=1, ..., $|e_k|$, j=1, ..., $|e_l|$, where $a_{kl}^{ij}$ indicates the relation between entity $i \in e_k$ and entity $j \in e_l$ (for example, in the tagged_with relation 6 of FIG. 1, $a_{ij}=1$ in relation $r_{kl}$ if image i is tagged with tag j, 0 otherwise). In the general case, $a_{ij}$ are real values from [0,1] range. Assuming that the relational graph includes b entity P types, $e_1, \ldots, e_b$. The total number of entities is $$N = \sum_{k=1}^{b} |e_k|.$$

The unfolded relational graph 119 is composed of $b^2$ blocks, one block for each ($e_k$, $e_l$) pair. Available relations fill some blocks, and other blocks can be left empty or filled with composed relations using the relation transitivity, $A_{kl} = A_{km} A_{ml}$ where $A_{kl}$ are basic or composed relations. The relation composition may depend on the given recommendation task.

With respect to the Flickr relational model 2 of FIG. 1, there are seven basic relations 6, 10, 14, 18, 20, 22, 26, which fill corresponding blocks in P and can compose other relations. The tag co-occurrence relationship is an example of a composed relation. If matrix $A_{TT}$ describes relation tagged_with (IMAGE,TAG), the tag co-occurrence matrix can be obtained by $A_{TT} = A'_{IT} A_{IT}$. Higher values in $A_{TT}$ indicate that occurrence more images are tagged with a given tag pair.

At S150, the general random walk generator 120 generates a random walk model 121 by constructing a Markov chain from the unfolded relational graph 119. The Markov chain constructed by the general random walk generator 120 has a stationary distribution π that works well for specific prediction tasks. A Markov chain over a set of states S is specified by an initial distribution $P_0$ over S, and a set of state transition probabilities $P(S_t|S_{t-1})$. A Markov chain defines a distribution over sequences of states, via a generative process in which the initial state $S_0$ is first sampled from according to $P_0$, and then states $S_t$ (for t=1, 2, ...) are sampled in order according to the transition probabilities. The stationary distribution of the Markov chain is given by $\pi(s) = \lim_{\infty} P(S_t=s)$, if the limit exists.

To ensure that the Markov chain has a unique stationary distribution, the module 120 resets the process with a probability α>0 according to the initial state distribution $P_0$. The probably α is a tuning parameter for the method, and in practice, a proper a probability prevents the chain from getting stuck in small loops. In the exemplary embodiment values of α ranging from about 0.05 to 0.40 produce good results, however other values for α are contemplated. Having the Markov chain $S_0, S_1, \ldots$ with the initial state $S_0$ distributed according to $S_0$, state transitions given by P and resetting probability α, it is straightforward to express the stationary distribution π as follows:

$$\alpha \sum_{t=0}^{\infty} (1-\alpha)^t P_0 P^t \quad (1)$$

Equation (1) can be used to efficiently compute π. Because terms corresponding to large t have very little weight $(1-\alpha)^t$, when computing π, this sequence may be truncated after the first few (on the order of $$\frac{1}{\alpha})$$

terms without incurring significant error. The output of the general random walk generator 120 is a random walk model 121. In the exemplary embodiment, the random walk model 121 is the same as the Markov chain.

At S160, the weight learning module 122 determines a set of weighted values 123 that represent the weighted contributions of each relation in the relational graph 106 for a given recommendation task. The weighted values 123 are used by the weighted random walk generator 124 to create a weighted random walk model 125 that combines the weighted values 123 and the previously created random walk model 121. In alternate embodiments, the weighted values 123 may be input into the system 100 without having to be calculated.

For illustration purposes, consider a given random walk model. A weight $w_{kl}$ expresses the relative contribution of a given relation $r_{kl}$ in the random walk model between entities $e_k$ and $e_l$. The weighted sum of relations expressed by $A = \Sigma_{kl} w_{kl} A_{kl}$, and $\pi(s)_j$ is a projection of the stationary distribution π on the entity type j.

To initiate random walk on the random walk model, the initial distribution $P_0$ is composed of b vectors $\delta_i$, i=1, ..., b, with all elements available for querying. Consequently, $P_0$ may be defined as a normalization of $[\delta_1, \delta_2, \ldots, \delta_b]$. Thus, if weights are known or recommended by an expert, equation (1) may be used for estimating the stationary distribution $\pi$ and its projection $\pi_j$. If the weights are unknown a priori, then the weight learning module 122 finds values for weights $w_{kl}$ which minimize a certain loss function.

Weight Learning

To learn the weights of a relational random walk, a stationary distribution $\pi$ is approximated with the truncated version and the optimization problem is expressed on weights $w_{kl}$ as a minimization of loss function when a prediction is applied to a training set. Thus, the weighted random walk is defined by a weighted Markov chain query which results in a probability distribution. Nodes having more links (e.g. relations between entities) with higher weights will accumulate more probability than nodes having less links and of lower weights. Moreover, weights on links can be inferred from the training set, where a model is an instantiation of the Markov model weights which minimizes the prediction error on a training set T.

Square Loss for Probability Estimation

To assist in the weight learning, a scoring function H is employed that assigns a [0,1] value to an entity of type $e_k$. The weight learning module 122 learns the function H from a set of known relations between entities, such as that derived from the social media data model 106 and/or the unfolded relational graph 119. The function H estimates the probability p for a given object i. Let y denote the true probability of i and let p its estimation by H. The price paid when predicting p in place of y is defined as a loss function l(y,p). The square loss between y and p is expressed as:

$$l_{sq}(y,p) = y(1-p)^2 + (1-y)p^2 \quad (2)$$

Note that the first and second partial derivatives in p are $$\frac{\partial}{\partial p} l_{sq}(y, p) = 2(p - y)$$

and $$\frac{\partial^2}{\partial^2 p} l_{sq}(y, p) = 2,$$

respectively.

Multi-Label Square Loss

Without loss of generality, a tag recommendation task is presented to illustrate the square loss function. Assume that a tag entity set has L tag instances. For a given image, let $Y_B$ denote a binary vector $Y_B = \{y_1, \ldots, y_L\}$ here $y_i$ is 1, if the image is tagged with tag i, i=1, ..., L. The probability distribution over the tag set TAG is $Y = (y_1, \ldots, y_n)$ where $y_i$ is 0 or $$\frac{1}{|Y_B|},$$

i=1, ..., L.

Let P denote an estimated tag probability distribution, $P = (p_1, \ldots p_L)$, where $$\sum_{i=1}^{L} p_i = 1.$$

The square loss of using distribution P in the place of Y is defined as:

$$L_{sq}(Y, P) = \frac{1}{L} \sum_{i=1}^{L} l_{sq}(y_i, p_i). \quad (3)$$

For the distribution square loss $L_{sq}$, the derivatives have the form:

$$\frac{\partial}{\partial P} L_{sq}(Y, P) = \frac{1}{L} \sum_{i=1}^{L} \frac{\partial}{\partial p_i} l_{sq}(y_i, p_i) = \frac{2}{L} \sum_{i=1}^{L} (y_i - p_i),$$

and similarly $$\frac{\partial^2}{\partial^2 P} L_{sq}(Y, P) = \frac{1}{L} \sum_{i=1}^{L} \frac{\partial^2}{\partial^2 p_i} l_{sq}(y_i, p_i) = 2$$

If a training set T of images has a tag probability distribution Y, the weight learning module 122 finds a scoring function H which minimizes the empirical loss over T, defined as:

$$\text{Loss}(H) = \frac{1}{|T|} \sum_{j \in T} L_{sq}(Y_j, P_j),$$

where $Y_j$ is the true probability vector for image j and $P_j$ is the prediction probability distribution.

The weighted sum of composed of b distinct entity types $$A = \sum_{kl}^{b} w_{kl} A_{kl}.$$

Larger values of $w_{kl}$ indicate more importance of relation between types i and j. Every matrix $A_{kl}$ for relation $r_{kl}$ is normalized with each state transition distribution. The matrix mixture A should satisfy the same condition and the constraint $\Sigma_l w_{kl} = 1$, $w_{kl} \geq 0$. The mixture matrix A is however is not required to be symmetric, so $w_{kl} \neq w_{lk}$ in the general case. Thus, the following optimization problem is presented:

$$\min_{w_{kl}} \text{Loss}(H) \text{ s.t. } 0 \leq w_{kl} \leq 1$$

$$\Sigma_l w_{kl} = 1, k=1, \ldots, b. \quad (5)$$

The constrained optimization problem (5) can be transformed into unconstrained one by introducing variables $v_{kl}$, k,l=1, ..., b and representing $w_{kl} = e^{v_{kl}} / \Sigma_m \exp(v_{km})$. The problem constrained on $w_{kl}$ becomes unconstrained on $v_{kl}$.

To solve problem (5), the weight learning module 122 uses a limited memory Broyden-Fletcher-Goldfarb-Shanno (L-BFGS) method. The L-BFGS algorithm is a member of the broad family of quasi-Newton optimization methods. These methods approximate the well-known Newton's method, a class of hill-climbing optimization techniques that seeks a stationary point of a (twice continuously differentiable) function. For such problems, a necessary condition for optimality is that the gradient be zero. Newton's method and the BFGS methods need not converge unless the function has a quadratic Taylor expansion near an optimum. Generally speaking, these methods use the first and second derivatives.

In quasi-Newton methods, the Hessian matrix of second derivatives need not be evaluated directly. Instead, the Hessian matrix is approximated using rank-one updates specified by gradient evaluations (or approximate gradient evaluations). The Broyden-Fletcher-Goldfarb-Shanno (BFGS) method is one of the most popular members of this class.

The L-BFGS uses a limited memory variation of the BFGS to approximate the inverse Hessian matrix. Unlike the original BFGS method which stores a dense n×n approximation, L-BFGS stores only a few vectors that represent the approximation implicitly. An optimization package with the L-BFGS routine is used in both Matlab and Python/Scipy environments.

The above iterative scheme may be generalized to all $w_{kl}$ dimensions, including the gradient $\nabla L(W)$ and the inverse of the Hessian matrix, $HL(W)$, where $W=(w_{kl})$, $k,l=1, \ldots, b$. This gives the following iterative sequence of approximated solutions $W_0, W_1 \ldots$:

$$W_{n+1}=W_n-[HL(W)]^{-1}\nabla F(W_n), n>0. \quad (6)$$

In order to deploy the quasi-Newton methods for the weighted random walks, the derivatives of the loss function with respect to variables $w_{kl}$ are obtained:

$$\frac{\partial \text{Loss}(H)}{\partial w_{kl}} = \frac{1}{|T|}\sum_{j\in T}\frac{\partial}{\partial P_j}L_{sq}(Y_j, P_j)\frac{\partial P_j}{\partial w_{kl}}, \quad (7)$$

where $$P_j = \alpha \sum_{t=1}^{k}(1-\alpha)^t P_0^j A^t$$

and $P_0^t$ is the initial probability distribution for image j.

The power series $A^t$, $t=1, 2, \ldots$ are the only terms in $P_j$ dependent on $w_{kl}$ and their first derivatives are provided by:

$$\frac{\partial A^t}{\partial w_{kl}} = \frac{\partial}{\partial w_{kl}}(A^{t-1}A) = \frac{\partial A^{t-1}}{\partial w_{kl}}A + A^{t-1}A_{kl}, \quad (8)$$

and the second derivatives are provided by:

$$\frac{\partial^2 A^t}{\partial^2 w_{kl}} = \frac{\partial^2 A^{t-1}}{\partial^2 w_{kl}}A + 2\frac{\partial A^{t-1}}{\partial w_{kl}}A_{kl}+ \quad (9)$$

At S170, the weighted random walk generator 124 generates a weighted random walk model 125 by applying the set of weighted values 123 from the weight learning module 122 to the random walk model 121 from the general random walk generator 120. In the exemplary embodiment, the set of weighted values 123 comprises a weight $w_{kl}$ for each relation $r_{kl}$ in the random walk model 121. Thus, each link transition probability between entities having a relation $r_{kl}$ in the random walk model 121 is multiplied by the value $w_{kl}$ to create the weighted random walk model 125.

At S180, the social media selection model 126 performs one or more random walks on the weighted random walk model 125 to identify one or more social media instances within the instantiated social media data 108. The initial query $P^0$ is used to initiate the random walk. The random walk starts from the state representing the single instance of social media data 104 upon which the recommendation task is to be performed. In the exemplary embodiment, the random walk then proceeds to successive states (i.e., entity instances) until a entity of the type requested (such as a TAG for an IMAGE) is found. This process may be repeated multiple times to select multiple entity instances for recommendation.

At S190, the social media selection module 126 outputs the selected entity instance(s) as recommendation(s) via the output device 128. In the exemplary embodiment, a list of entity instances is output, however in alternate embodiments, the entity instances themselves may be output.

The method illustrated in FIG. 4 may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method described above may be performed in either bootstrap or query mode. In bootstrap mode, the task is to recommend an entity instance (e.g., a specific tag) to associate with a newly uploaded social network entity instance (e.g., a specific image). By way of illustrative example, in bootstrap mode tag recommendations are provided for a newly uploaded image or video clip. In query mode, an entity instance already has pre-existing entity instances related to it (for example, an image already has some assigned tags), and these pre-existing relations are included in the unfolding process so that they are considered when making a recommendation.

EXAMPLES

A quantitative evaluation was performed on a Flickr data set downloaded through the Flickr API. The dataset includes about 2,000 users, 500,000 images with about 1.7 million comments and 200,000 tags.

Weighted random walk learning was tested on three entity types, IMAGE, TAG and USER. The three core relations are $R_{IT}$=tagged_with (IMAGE,TAG), $R_{UI}$=owner (USER,IMAGE) and $R_{UU}$=contact (USER, USER). Composed relations depend on the recommendation task.

For the tag recommendation, the image-to-image matrix was composed as $A_{II}=A_{IT}A'_{IT}$, and was additionally weighted by the similarity using the visual features, extracted with the help of a visual categorization toolbox. Other composed relations are tag-to-tag $A_{TT}=A_{IT}A'_{IT}$ and user-to-tag $A_{UT}=A_{UI}A_{IT}$, and their inversion. For user contact recommendation, the composed matrices are $A_{II}=A_{UT}A'_{UT}$ and $A_{UT}=A_{UT}A_{IT}$. The matrix A is a l×l block-wise with l=3 and the optimization is done on $l^2$ weights $w_{ij}$.

Two of the tested recommendation tasks are tag recommendation for images and contact recommendation for users. The former runs either in the bootstrap or query mode. In bootstrap mode, the task is to predict tags for a newly uploaded image. In query mode, an image may have some tags and the prediction task is to expand the set of tags by recommending new tags. In both modes, the performance of predicting the top 5 and 'size' tags where the number |size| of tags vary from image to image is known in advance (and equals to the test tag set). Contact recommendation was tested in the query mode only.

Precision, recall and F1 evaluation metrics defined in the multi-labeled mode were used. Let $Y_i$ and $P_i$ denote the true and prediction tag vectors for image i, respectively. Then, precision and recall are defined as $$P_r = \sum_i \frac{|Y_i \cup P_i|}{|Y_i|}$$

and $$Re = \sum_i \frac{|Y_i \cup P_i|}{|P_i|},$$

respectively. F1-score is then defined as $$2\frac{Pr \cdot Re}{Pr + Re}.$$

The weights of random walks are learned and compared to baseline performance results given by the unweighted schema. The unweighted schema is composed with core and composed relations with the equal weights. The initial distributions vary in the function of query type. The average values are reported over 5 independent runs.

Figure 5:
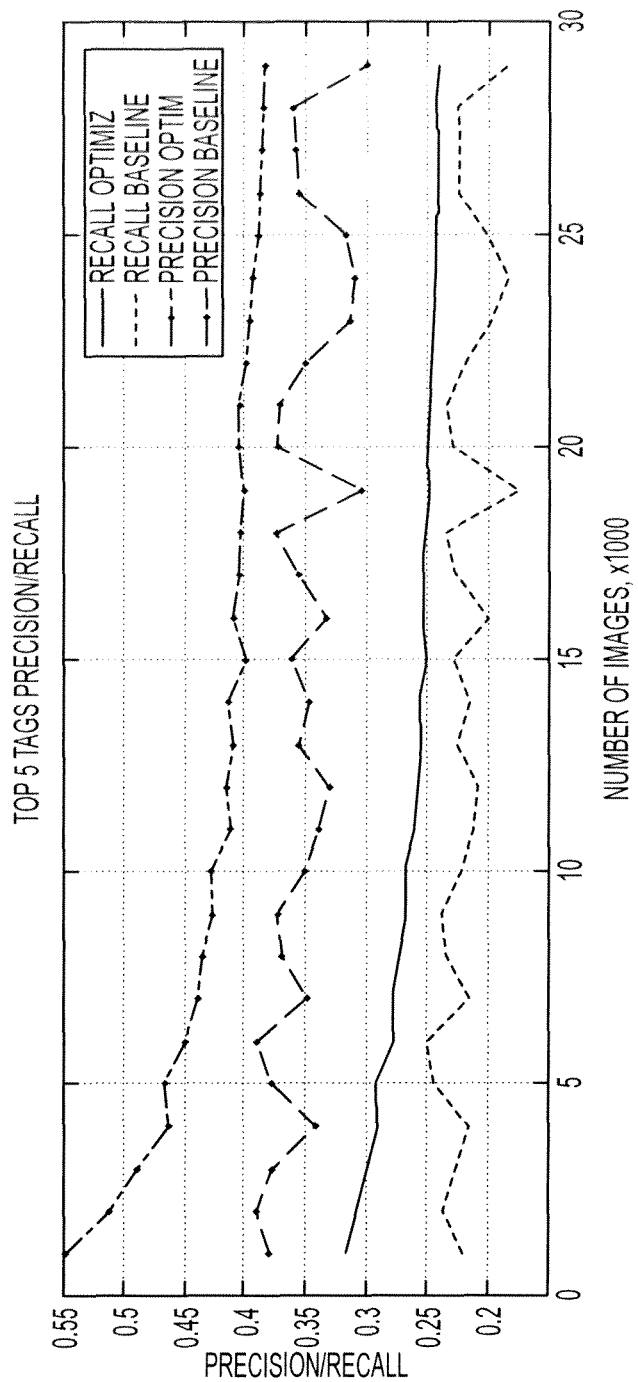
FIGS. 5-9 graphically illustrate results from an evaluation of the exemplary method and system.

FIG. 5 reports the recall and precision values for the bootstrap tag recommendation, with the size of the image set varied from 1,000 to 25,000. The test is run in the leave-one-out schema, with the top 5 predicted tags are compared to the true tag set.

Figure 6:
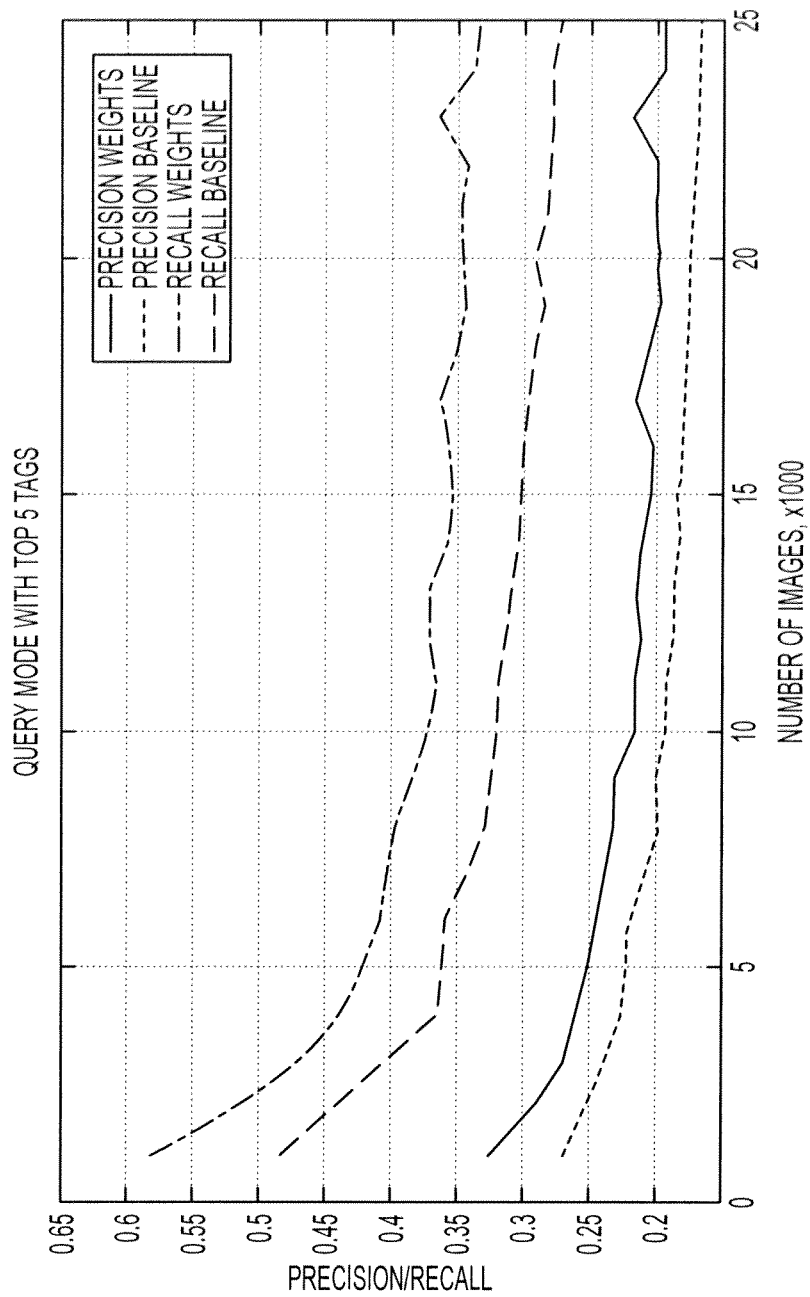
Figure 7:
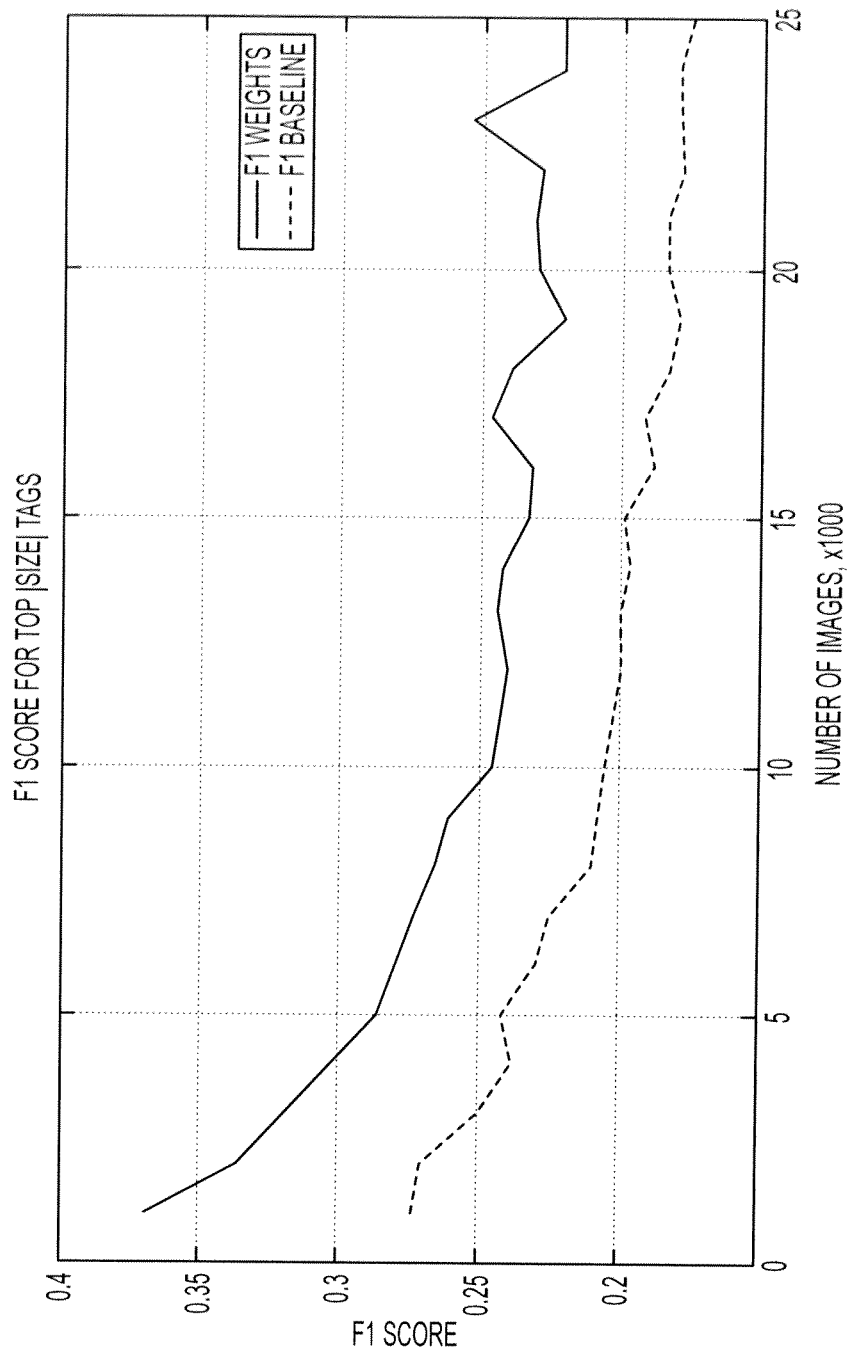

FIG. 6 reports the recall and precision values for the query tag recommendation, where the size of the image set varies from 1,000 to 25,000. In this evaluation, 50% of tags are randomly selected to form the query for a given image, and the remaining 50% tags are used for testing. The top five predicted tags are then compared to the true tag set. Precision and recall gain over the unweighted is around 5% and 3% respectively. Additionally, FIG. 7 reports F1 score values for the same setting, where the number of predicted tags is not five but equals to the test tag set.

Figure 8:
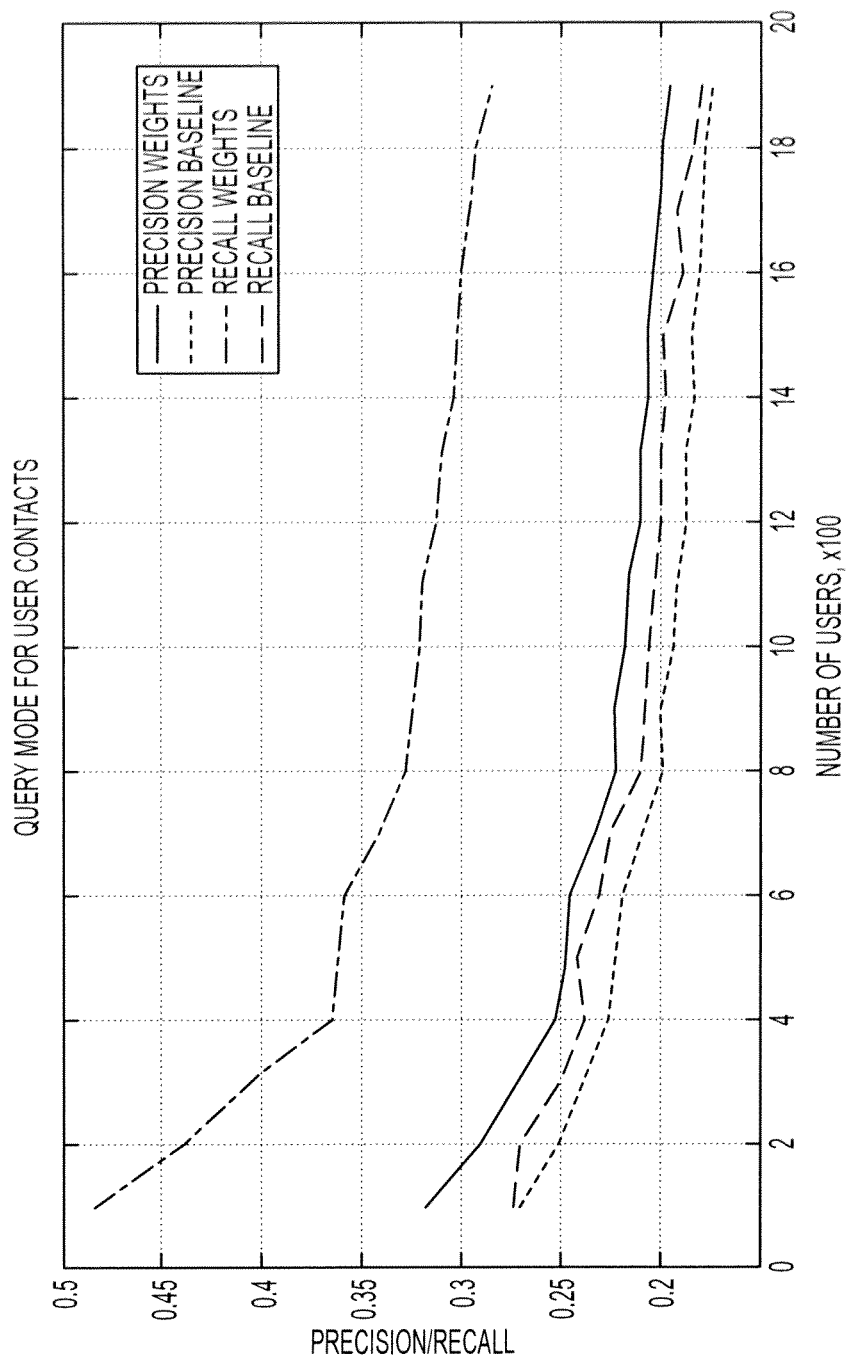

Additionally, the query-based scenario has been tested on the users' contact recommendation task. Like in the previous test, 50% of a user's contacts are randomly selected to form a query, and the remaining 50% contacts are used for testing. FIG. 8 reports precision and recall values for the top five recommended contacts, wherein the number of users vary from 100 to 1900. One can observe a much higher gain in precision than in recall.

Figure 9:
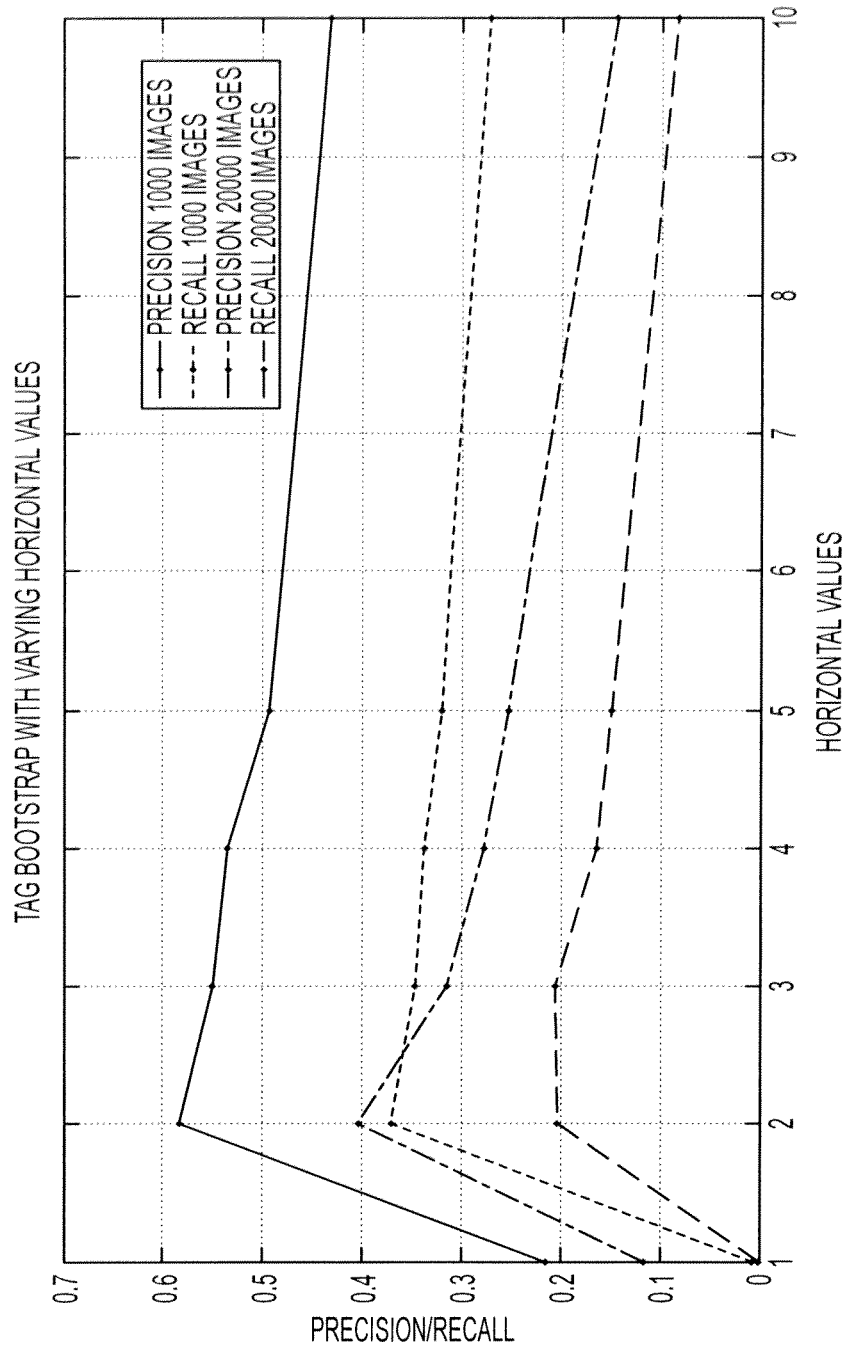

Finally, FIG. 9 illustrates the impact of different truncations in Equation (1) on the performance reported for the precision and recall values for two cases of 1,000 and 20,000 images, when the sequence is truncated after 1, 2, 3, 4, 5 or 10 iterations. As FIG. 9 suggests, both measures achieves their top values for very small values, such as 2 or 3.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method comprising:
    making a recommendation to a user of a social network to associate an existing tag with a social media entity instance by operations including:
        generating a random walk model that includes the social media entity instance for at least a portion of the social network;
        determining weighted values for the random walk model using a limited memory Broyden-Fletcher-Goldfarb-Shanno BFGS (L-BFGS) method;
        generating a weighted random walk model based on the random walk model and the weighted values;
        performing a random walk on the weighted random walk model starting at the social media entity instance; and
        recommending an existing tag to the user based on the random walk;
    wherein at least the performing of the random walk is performed by a computer processor.

2. The method of claim 1, wherein the weighted values are determined by approximating a stationary distribution for the random walk model and optimizing the stationary distribution by using a minimization of loss function in conjunction with a training set.

3. The method of claim 1, further comprising:
    providing instantiated social network data in computer memory; and
    determining an unfolded relational graph by unfolding the instantiated social media data into co-occurrence matrices based at least in part on a relational graph representing a social media data model of the social network.

4. The method of claim 3, wherein the random walk model is generated based at least in part on the unfolded relational graph.

5. The method of claim 3, wherein the generating of the random walk model comprises transforming the relational graph into a Markov chain comprising a stationary distribution and a set of state transition probabilities.

6. The method of claim 5, wherein the generating of the weighted random walk model comprises applying the weighted values to at least one of the stationary distribution and the set of state transition probabilities of the Markov chain.

7. The method of claim 5, wherein the social network is an interconnected electronic network structure comprising entities having defined relations between the entities.

8. The method of claim 7, wherein the recommendation task comprises recommending one or more instances of a first entity in the social network for an instance of a second entity in the social media network.

9. The method of claim 8, wherein the first and second entity are the same.

10. The method of claim 8, wherein the recommendation task is performed in a bootstrap mode or query mode;
wherein in bootstrap mode, the instance of the second entity is newly uploaded to the social media network and no instance of the first entity is associated with the instance of the second entity; and
wherein in query mode, there exists an instance of the first entity associated with the second entity.

11. The method of claim 7, wherein the social media network comprises an integration of entities and relations from multiple social media networks.

12. The method of claim 7, wherein the relations of the relational graph are internally homogeneous such that the same values in a relation tend to have the same importance for the recommendation task.

13. The method of 7, wherein the weighted values for the random walk model represent the weighted contributions of each relation in the relational graph for the recommendation task.

14. The method of claim 7, wherein the generation of the random walk model includes composed relations of the relational graph.

15. The method of claim 7, wherein the entities have a type of at least one of:
an image;
a video;
a user;
a group;
a tag; and
a comment.

16. A non-transitory storage medium storing instructions, which when executed by a computer or digital processing device perform a method of making a recommendation to a user of a social media network to associate an existing tag with a social media entity instance by operations comprising:
determining an unfolded relational graph by unfolding instantiated social media network data into co-occurrence matrices based at least in part on a relational graph representing a social media data model of the social media network;
generating a random walk model that includes the social media entity instance for at least a portion of the social media network by transforming the unfolded relational graph into a Markov chain over a set of states S having a set of state transition probabilities $P(S_t|S_{t-1})$ and a stationary distribution $\pi$ approximated by initial terms of the sum $$\alpha \sum_{t=0}^{\infty} (1-\alpha)^t P_0 P^t$$

where $P_0$ is an initial distribution, $\alpha$ is a reset probability value, and the number of initial terms in the approximation is on the of order $1/\alpha$;
determining weighted values for the random walk model;
generating a weighted random walk model based on the random walk model and the weighted values;
performing a random walk on the weighted random walk model starting at the social media entity instance; and
recommending an existing tag to the user based on the random walk.

17. The non-transitory storage medium of claim 16, wherein the reset probability value $\alpha$ is in the range 0.05 to 0.40.

18. A system for performing a recommendation task, the system comprising:
memory for storing (i) a relational graph representing a social media data model of a social media network, and (ii) instantiated social media data;
a relational graph unfolding module adapted to determine an unfolded relational graph by unfolding the instantiated social media data into co-occurrence matrices based at least in part on the relational graph;
a general random walk generator adapted to generate a random walk model based at least in part on the recommendation task and the unfolded relational graph;
a weighted random walk generator adapted to generate a weighted random walk model based on the random walk model and weighted values;
a weight learning module adapted to determine the weighted values by approximating a stationary distribution for the random walk model and optimizing the stationary distribution by using a minimization of loss function in conjunction with a training set, the weight learning module employing a limited memory BFGS (L-BFGS) method to determine the weighted values; and
a social media selection module adapted to perform a random walk on the weighted random walk model, and output a recommendation based at least in part on the random walk.

19. The system of claim 18,
wherein the general random walk generator is further adapted to transform the relational graph into a Markov chain comprising a stationary distribution and a set of transition probabilities; and
wherein the weighted random walk generator is further adapted to apply the weighted values to at least one of the stationary distribution or and the set of state transition probabilities of the Markov chain.

20. An apparatus comprising:
a digital processor configured to perform a recommendation task by a method including:
generating a random walk model for a social media data model based at least in part on the recommendation task by determining a Markov chain over a set of states S specified by an initial distribution $P_0$ over S, and a set of state transition probabilities $P(S_t|S_{t-1})$;
learning weighted values for the random walk model;
generating a weighted random walk model based on the random walk model and the learned weighted values; and
performing a random walk on the weighted random walk model to generate one or more recommendations;
wherein the Markov chain state transition probabilities are reset with a probability $\alpha>0$ according to the initial state distribution $P_0$, and the stationary distribution $\pi$ is defined as:

$$\pi = \alpha \sum_{t=0}^{\infty} (1-\alpha)^t P_0 P^t.$$

21. The apparatus of claim 20, wherein the probability $\alpha$ is from about 0.05 to 0.40.

* * * * *